United States Patent [19]

Solomon

[11] Patent Number: 4,666,376

[45] Date of Patent: May 19, 1987

[54] SOLAR POWERED PUMP ASSEMBLY

[76] Inventor: Fred D. Solomon, 171-147 Granger Rd., Medina, Ohio 44256

[21] Appl. No.: 617,039

[22] Filed: Jun. 4, 1984

[51] Int. Cl.$^4$ ............................................. F04B 17/00
[52] U.S. Cl. .................................. 417/379; 60/641.8; 91/346; 126/419; 126/422
[58] Field of Search ............. 60/641.8, 641.11, 641.15, 60/669; 417/379, 401; 91/346, 347; 126/419, 422, 443

[56] References Cited

U.S. PATENT DOCUMENTS

| Re. 27,740 | 8/1973 | Schuman | 417/207 |
|---|---|---|---|
| 2,370,068 | 2/1945 | Palm | 91/346 X |
| 2,637,304 | 5/1953 | Dinkelkamp | 91/346 X |
| 2,641,187 | 6/1953 | Adams | 91/347 X |
| 2,688,923 | 8/1954 | Bonaventure et al. | 417/379 |
| 3,309,012 | 3/1967 | Booth et al. | 417/379 |
| 3,937,599 | 2/1976 | Thureau et al. | 417/389 |
| 3,994,132 | 11/1976 | Jackson | 60/325 |
| 4,068,476 | 1/1978 | Kelsey | 60/671 |
| 4,110,986 | 9/1978 | Tacchi | 60/641 |
| 4,220,139 | 9/1980 | Ramsden | 126/422 X |
| 4,227,866 | 10/1980 | Stubbs | 417/379 |
| 4,232,655 | 11/1980 | Frissora et al. | 126/422 X |

Primary Examiner—Leonard E. Smith
Attorney, Agent, or Firm—Renner, Kenner, Greive, Bobak & Taylor

[57] ABSTRACT

An apparatus for converting low level thermal radiation into mechanical work. The apparatus incorporates a collector (11) to receive and concentrate low level thermal energy to generate a pressure by vaporizing a working fluid. An expansible chamber (70), having at least one movable wall, defined by a diaphragm (54), is selectively in fluid communication with the collector (11). A movable piston (61) is operatively associated with the movable wall of the expansible chamber (70). A connecting rod (71) is secured at one end to the movable piston (61); the other end of the connecting rod (71) is suitable for connecting to a mechanical load. A valve spool (73), slidably associated about the surface of the connecting rod (71) effects fluid communication of the expansible chamber (70) alternately with the collector (11) and an exhaust chamber (124), the latter having a pressure substantially less than the work pressure of the collector (11). A compressor (106) receives working fluid from the exhaust chamber (124) and supplies it to the collector (11).

22 Claims, 8 Drawing Figures

SOLAR POWERED PUMP ASSEMBLY

TECHNICAL FIELD

The present invention relates generally to solar powered assemblies capable of generating mechanical work. In particular, the present invention relates to a solar powered pump assembly using a compressible working fluid in a thermodynamic cycle to convert solar energy into mechanical work. More particularly, the present invention relates to a solar powered pump assembly having a simple and compact configuration such that a minimal amount of working fluid is required to effect the thermodynamic cycle. Furthermore, the present invention relates to a solar powered pump assembly capable of regulating the quantity of solar radiation received by the solar collector. In addition, the present invention relates to a solar powered pump assembly suitable for integration into a solar heating system as a primary circulation pump.

BACKGROUND ART

With the rising cost of conventional fuels, such as coal, oil and natural gas, along with diminishing domestic reserves of each, attention has been directed to developing alternative energy sources. Among the most convenient energy sources readily available is the thermal radiation of the sun. Although this source of energy is readily adaptable for heating purposes, it has been relatively difficult and expensive to convert into usable mechanical work. As such, the vast potential of solar energy has yet to be fully realized.

Some of the applications to which solar generated mechanical energy is suitable can be found in the need to power pumps and machinery in remote regions where conventional energy sources are not available. These applications include the need of power for irrigation pumps in remote areas of underdeveloped countries or other areas where it is either impossible or impractical to supply a conventional energy source, such as electricity. Also, the need of employing solar mechanical energy is finding application in the space exploration program, as artificial satellites and manned space craft remain in orbit for extended periods of time without access to any energy sources other than the sun. Furthermore, in solar heat exchangers of the circulating-water type, it is desirable to eliminate the need for electric pumps to circulate the water, and replace them with solar powered pumps thereby further reducing the reliance on conventional energy sources.

Various efforts have been made to harness the energy of the sun and convert it into useful mechanical work. Among these efforts is the process of using photovoltaic cells to generate electrical current which is then used to power electric motors which, in turn, drive pumps or other machinery. Such systems have found little practical application because of the exorbitant cost of the equipment needed for such systems, and also because of the poor system efficiency resulting from the conversions of solar energy first to electrical energy and then to mechanical energy. As such, these systems have been little more than experimental apparatus in test laboratories or space satellites.

Systems have been developed to convert solar energy directly into mechanical energy, as shown in the disclosure of U.S. Pat. No. 4,227,866. These systems necessitate very large, and very expensive, solar collectors to generate the required work pressure. As such, these ungainly devices require a substantial amount of ground space to support them and thus are limited in application, generally to rural underdeveloped areas where ground space is not of any major concern. These devices are not suitable for installation in space satellites, of on the roof top of a building, or any other location where space is at a premium.

Despite the extensive efforts to harness the energy of the sun, no practical embodiment has yet been developed to convert solar energy into usable mechanical energy efficiently and economically, or to do so in an embodiment readily adaptable for incorporation in a system where a large amount of space is not available.

DISCLOSURE OF THE INVENTION

It is, therefore, an object of the present invention to provide a solar powered device capable of converting solar radiation energy into useful mechanical work.

It is another object of the present invention to provide a solar powered device to convert solar radiation energy into useful mechanical work, as above, which is compact in size and efficient in operation.

It is a further object of the present invention to provide a solar powered device, as above, which is capable of converting solar radiation energy directly into mechanical energy.

It is yet another object of the present invention to provide a solar powered device, as above, which is suitable for incorporation in a solar water heating system, as the primary circulation pump.

It is still a further object of the present invention to provide a solar powered device, as above, which is capable of regulating the exposure of the solar collector to solar radiation.

These and other objects of the invention, as well as the advantages thereof over existing and prior art forms, which will be apparent in view of the following specification, are accomplished by means hereinafter described and claimed.

In general, apparatus for converting thermal energy into mechanical work according to the concept of the present invention includes a collector to receive and concentrate low level thermal energy to generate a work pressure by vaporizing a working fluid. An expansible chamber having at least one movable wall is in thermal communication with the collector. A reciprocating piston is operatively associated with the expansible chamber. A connecting rod is secured at one end to the reciprocating piston and has a fluid port communicating with the expansible chamber. The other end of the connecting rod is suitable for connecting to a mechanical load. A compressor supplies condensed work fluid to the collector. A valve slidably associated about the outer surface of the connecting rod connects the expansible chamber alternately with the collector and an exhaust chamber, the latter having a pressure substantially less than the work pressure of the collector.

EXEMPLARY EMBODIMENT FOR CARRYING OUT THE INVENTION

Figure 1:
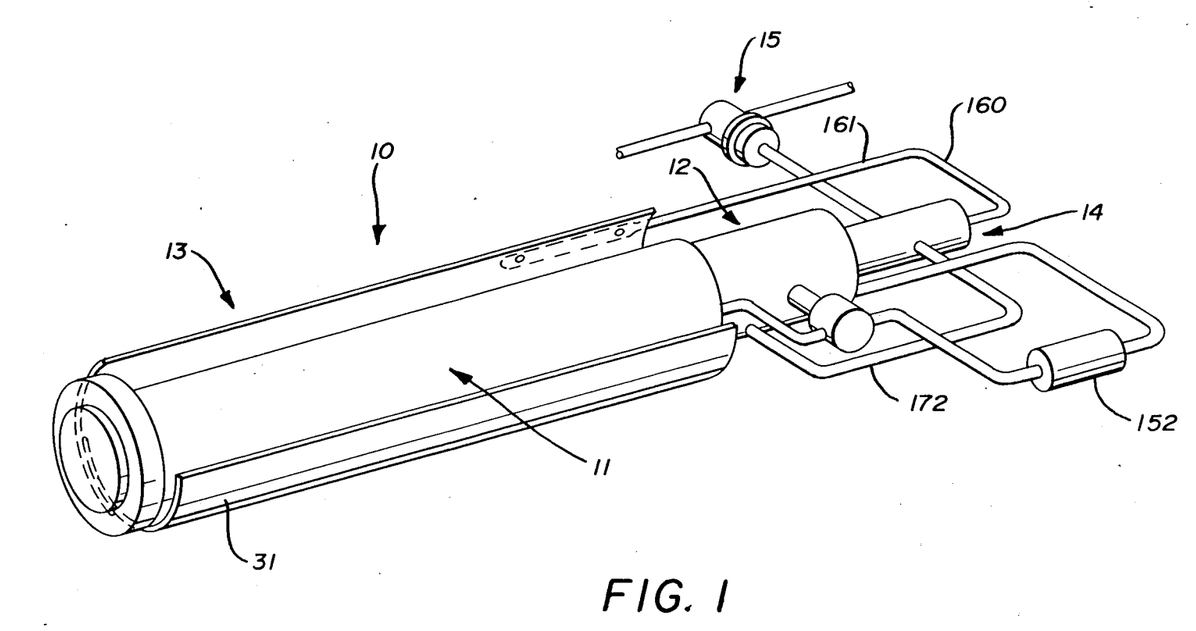
FIG. 1 is a perspective view of a solar powered driver assembly embodying the concepts of the present invention.

A solar powered driver assembly according to the concept of the present invention is indicated generally by the numeral 10 in FIG. 1 of the attached drawings. The solar powered driver assembly 10 employs a solar collector, generally indicated by the numeral 11, to absorb solar radiation, a pump assembly, generally referred to by the numeral 12, to transform the solar energy into mechanical work, and a sun shield, generally indicated by the numeral 13 and control element, generally indicated by the numeral 14, therefor to regulate the amount of exposure of the collector 11 to solar radiation. The exemplary embodiment of FIG. 1 depicts the solar powered pump assembly 10 as it might be employed to operate an exemplary circulation pump, generally indicated by the numeral 15, of the type used in solar water heater systems.

Figure 2A:
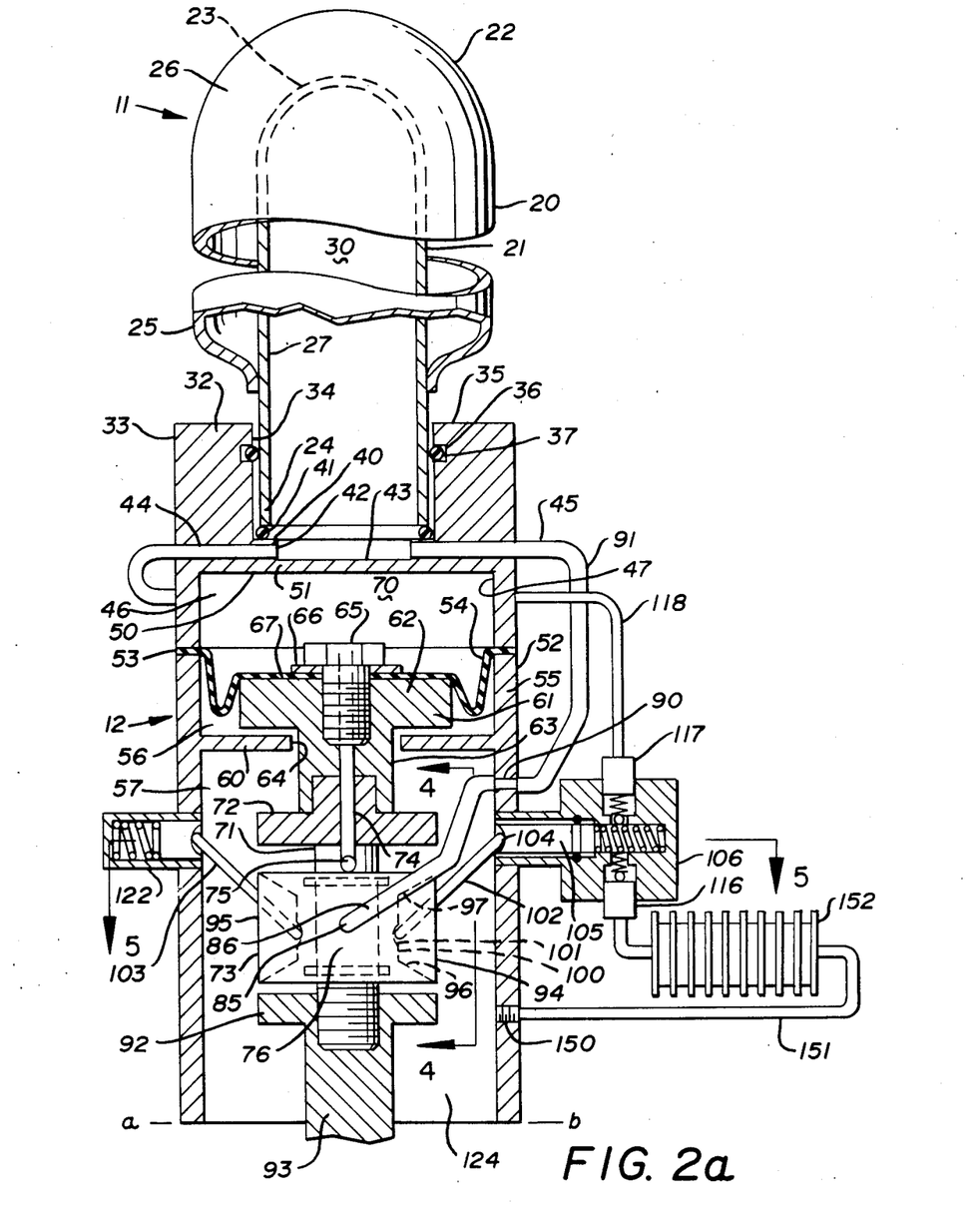
FIGS. 2a and 2b comprise a cross-sectional schematic view of the pump assembly of FIG. 1 showing the piston assembly in the fully extended position, line a-b of FIG. 2a joining with line a'-b' of FIG. 2b.
Figure 2B:
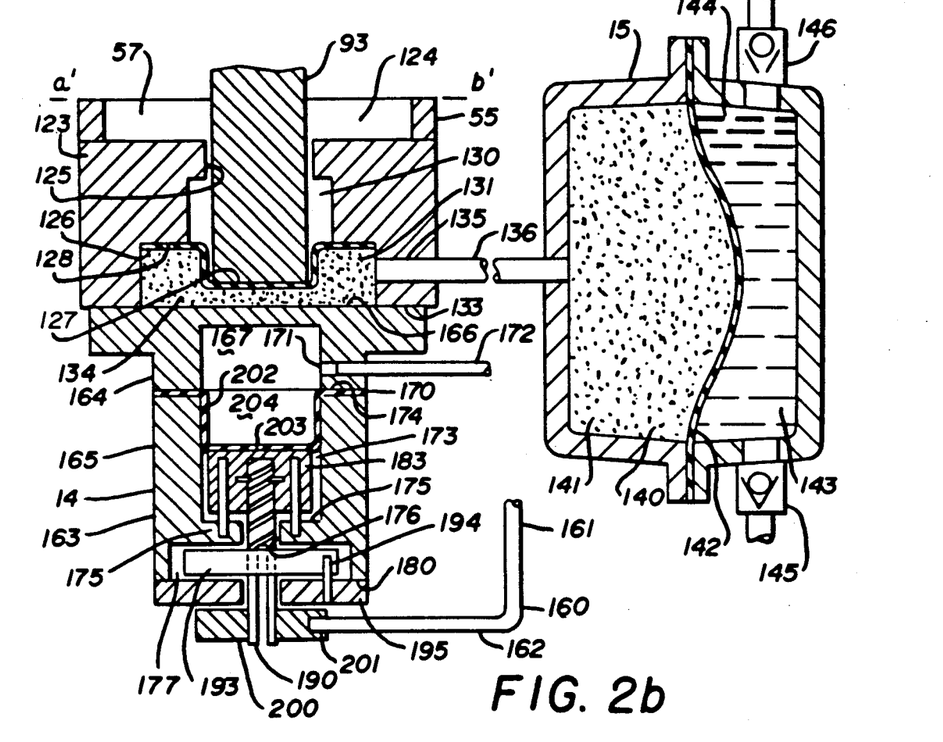

Referring particularly to FIGS. 2a and 2b, the componential structure of the pump assembly 12 is shown in detail. The solar collector 11 consists primarily of a vacuum bottle type glass element having a cylindrical outer shell 20 coaxially oriented in relation to a cylindrical inner tube 21, each terminating at one end in corresponding bulbous walls, 22 and 23 respectively, thus forming a pair of nested glass envelopes. The other end of the inner tube 21 forms a continuous peripheral rim 24 suitable for installation on the pump assembly 11, as discussed hereinbelow, while the other end of the outer shell 20 terminates in an annular wall 25 sealingly joined to the wall of the inner tube 21, thus forming a generally annular region of dead-air space 26. It should be appreciated that the dead-air space 26 forms an insulating barrier between the outer shell 20 and the inner tube 21. Furthermore, it should be appreciated that by evacuating substantially all air from the dead-air space 26 a preferred partial vacuum is formed so the insulating quality of the arrangement is substantially increased by an effective thermal barrier,—that is, essentially no conductive transfer of heat through the region.

The inner surface of the inner tube 21 may be coated with a dark, opaque, light-absorbing coating 27 to enhance the absorption of solar radiation by the collector 11. It should thus be recognized that a collector made in accordance with the foregoing allows for a highly efficient conversion of solar radiation into usable heat within the interior chamber 30 of the inner tube 21. The overall efficiency of the solar collector 11 is enhanced through the use of a reflective element 31 of sun shield 13 which focuses and directs the solar radiation toward the central axis of the collector 11. As such, it should be appreciated that a substantial amount of solar radiation can be harnessed through the use of a relatively small and compact solar collector 11, thereby obviating the need for large conventional collectors.

The solar collector 11 is operatively associated with the pump assembly 12 through sealing engagement with a cylinder head 32. For reasons which will become apparent hereinbelow, the cylinder head 32 is made from rigid material having good thermal conductivity, such as brass for example. The cylinder head 32 is substantially a cylindrical member having a continuous outer surface 33 of a diameter substantially uniform with that of the remainder of the pump assembly 12. An axial receptacle 34 extends axially inward from an outer face 35 and has a diameter slightly greater than the outer diameter of the peripheral rim 24 of the inner tube 21. A radial groove 36 is formed in the periphery of the receptacle 34 for the introduction and positioning of a first O-ring 37 and is of such diameter as to apply the appropriate radial sealing force between the O-ring 37 and the outer periphery of the inner tube 21. The axial receptacle 34 terminates in an annular shoulder 40 which provides support for the positioning of a second O-ring 41, the latter of which preferably has a mean diameter substantially equal to the mean diameter of the peripheral rim 24 of the inner tube 21. The axial offset 42 formed by the annular shoulder 40 and a radial surface 43 of the axial receptacle 34 provide a region suitable for the positioning of an inlet port 44 and an outlet port 45, each of which extends diametrically outward for fluid communication with the outer surface 33 of the cylinder head 32.

The solar collector 11 is sealingly engaged within the axial receptacle 34 by means of the first O-ring 37, which creates a radial seal and support against the outside of the inner tube 21, and the second O-ring 41, which provides a lateral seal and support against the peripheral rim 24 of the inner tube 21. The solar collector 11 can be secured within the axial receptacle 34 by any suitable retention device such as clamp elements, adhesives, or other devices which will be apparent to persons skilled in the art. It has been found that a radial band secured to the outer shell 20 and attached to cylinder head 32 provides adequate support to withstand the internal pressures generated within the solar collector 11.

Opposite the axial receptacle 34, and coaxial thereto, the cylinder head 32 defines an interior cavity 46 having an axially extending internal surface 47, which is substantially concentric with the outer surface 33, and a planar surface 50, the latter being substantially parallel to the radial surface 43 of the axial receptacle 34. A wall member 51 defined by the parallel orientation of the radial surface 43 and the planar surface 50 is preferably of substantial thickness to resist the axial forces associated with the pressures generated within the solar collector 11 and acting upon the radial surface 43.

The cylinder head 32 is sealingly joined to the cylinder housing 52 in coaxial orientation to form an annular joint 53, in which is interposed the outer periphery of a diaphragm 54. The cylinder housing 52 is substantially a cylindrical member having coaxial inner and outer surfaces defined by a cylinder wall 55. The interior of the cylinder housing 52 is subdivided into first and second interconnected chambers, 56 and 57 respectively, by an annular wall 60 which extends radially inwardly from the cylinder wall 55. The first chamber 56 may be of substantially less volume than the second chamber 57, it being appreciated that the former need merely be large enough to accommodate a piston 61 during full stroke thereof.

The piston 61 has a piston head 62 and a concentric piston body 63 of a lesser diameter which extends axially through an opening 64 in the annular wall 60 to effect radial alignment of the piston 61 within the first chamber 56. The diaphragm 54 is secured to the piston head 62 by means of a screw fastener 65 and retainer washer 66 which provides for enlarged sealing engagement of the diaphragm 54 with the piston face 67.

It should be appreciated that the thus installed diaphragm 54 and interior cavity 46 of the cylinder head 32 define an expansible chamber 70 which permits axial displacement of the piston 61 corresponding to a change of pressure in the expansible chamber 70. The axial displacement of the piston 61, i.e., the stroke, is controlled by the internal axial dimension defined by the positioning of the annular wall 60 with respect to the planar surface 50 of wall member 51. It should thus be understood that the positioning of the annular wall 60 in the cylinder housing 52 is a design parameter dependent upon the desired work output.

Figure 3:
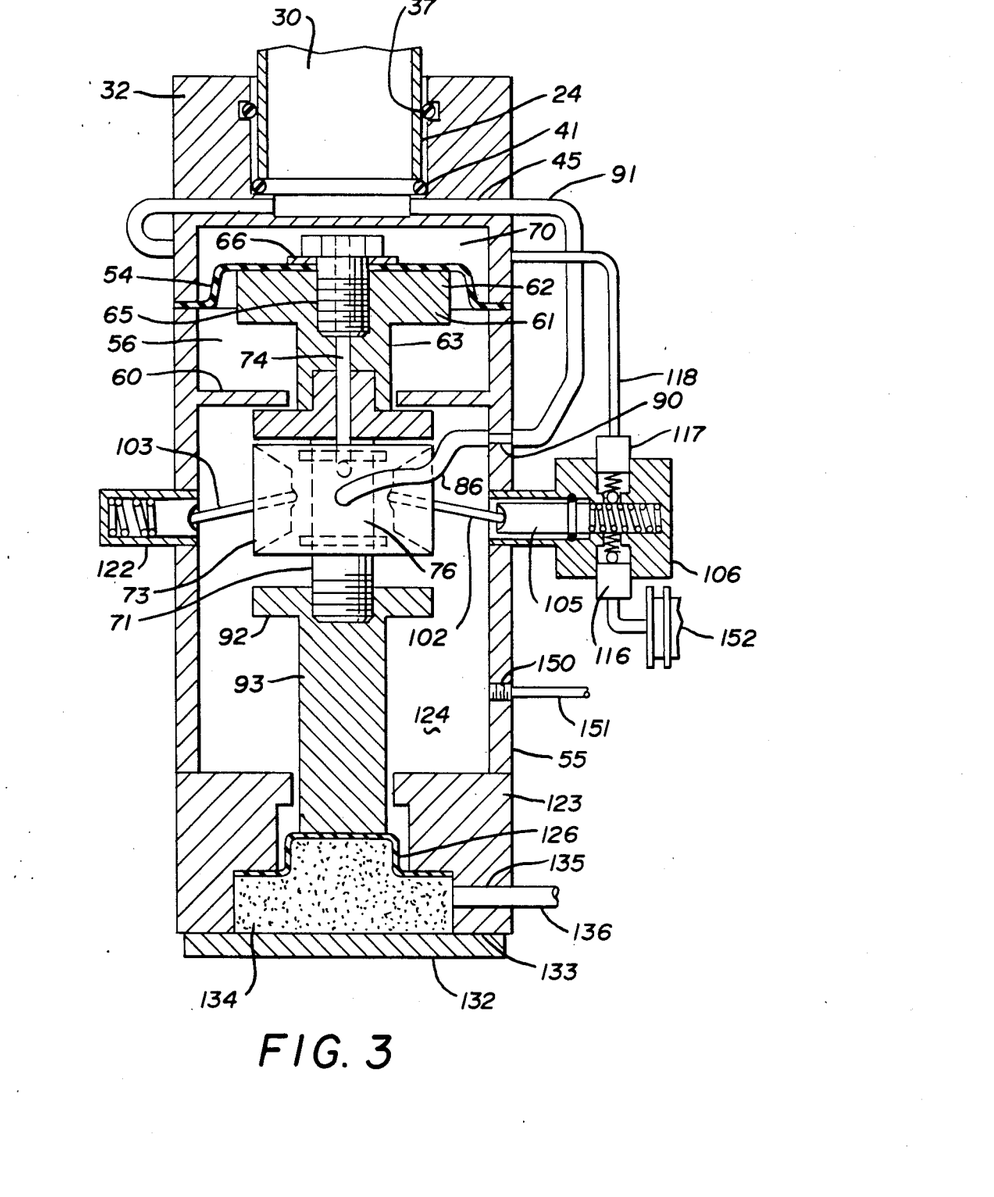
FIG. 3 is a fragmentary cross-sectional view of the pump housing of FIG. 2 showing the piston assembly in the fully retracted position.
Figure 4:
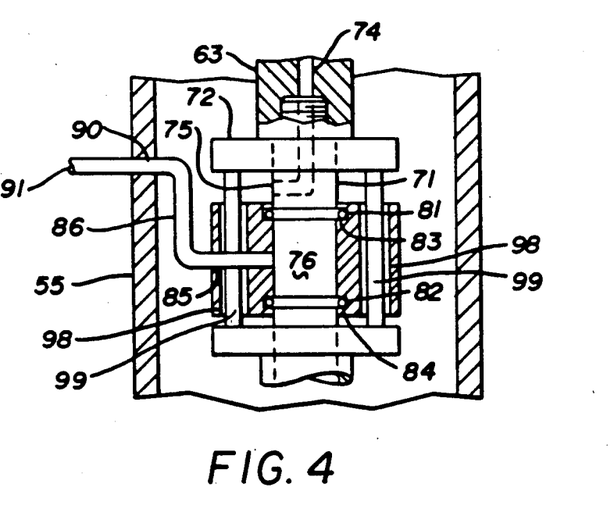
FIG. 4 is a fragmentary longitudinal cross-section of the valve of FIG. 2, taken substantially along line 4—4 thereof.

The piston 61 is threadably secured to a connecting rod 71 having a shoulder member 72 abuttingly engaging the piston body 63. The shoulder member 72 has a diameter substantially greater than the piston body 63 such that it forms a mechanical stop with the annular wall 60 when the piston 61 is in the fully retracted position, as shown in FIG. 3. In addition, the shoulder member 72 also acts as a mechanical stop with respect to the axial travel of a valve spool 73 attached to connecting rod 71 as will be discussed in detail hereinbelow. An axial passageway 74 extends through the screw fastener 65, the piston 61 and a distance into the connecting rod 71 where it intersects a radial passageway 75 in the vicinity of the valve spool 73 and in close proximity to the shoulder member 72, as shown in FIG. 4. It should be appreciated that the intersecting passageways 74 and 75 permit fluid communication between the expansible chamber 70 and alternatively with the second chamber 57 of the cylinder housing 52 or a high pressure region 76 of the valve spool 73, as detailed hereinbelow.

Figures 5, 6:
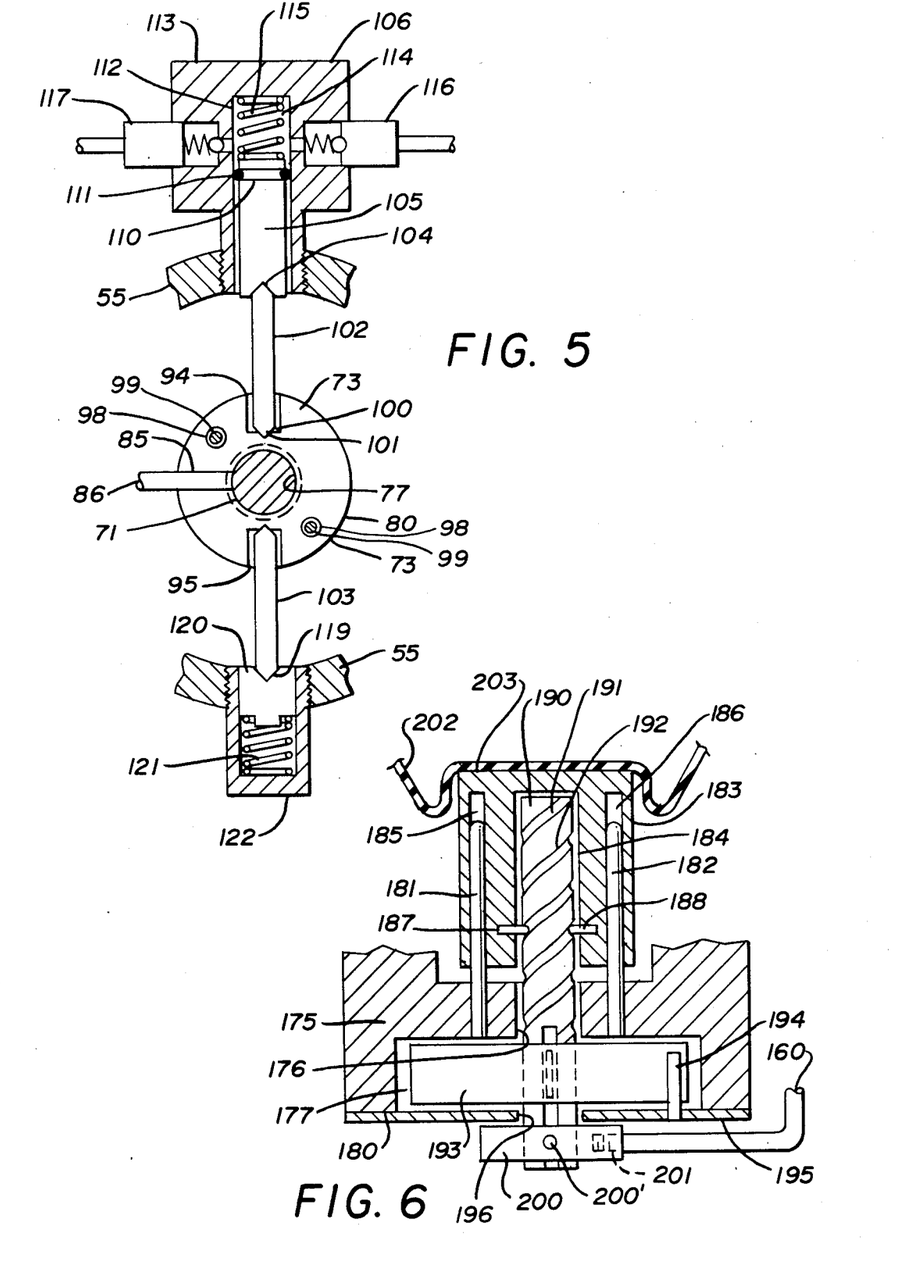
FIG. 5 is a fragmentary transverse cross-section of the valve means and compressor of FIG. 2, taken substantially along line 5—5 thereof.
FIG. 6 is a fragmentary longitudinal cross-section of the sun shield positioning means.

The valve spool 73 is a substantially cylindrical member having an inner core 77 concentric with the exterior surface 80 thereof, as shown in FIG. 5. The diameter of the inner core 77 is slightly greater than the diameter of the connecting rod 71 such that the valve spool 73 may be slidably movable relative thereto. Radial grooves 81 and 82 are formed in the inner core 77 at axially distal locations therein for containing seal members 83 and 84, for example U-cup shaft seals, such that the high pressure region 76 is defined therebetween. A radial orifice 85 extends outwardly from the high pressure region 76 through the valve spool 73 and connects with a flexible interior conduit 86. The interior conduit 86 sealingly connects to the interior end of a nipple 90 which is sealed about its outer periphery to the cylinder wall 55. One end of an exterior conduit 91 is sealingly connected to the exterior end of nipple 90 with the other end of the exterior conduit 91 being sealably joined to the outlet port 45 in the cylinder head 32. It should be recognized here that the foregoing enables the interior chamber 30 of the solar collector 11 to be in continuous fluid communication with the high pressure region 76 of the valve spool 73.

A stop member 92 is threadably engaged preferably to the extremity of connecting rod 71 to define, with the shoulder 72, an axial travel limit for the valve spool 73.

The axial location of stop member 92 is such as to allow the valve spool 73 to traverse a sufficient axial distance relative to the connecting rod 71 to enable the radial passageway 75 to be disconnected from the high pressure region 76 of the valve spool 73, as shown in FIG. 4. While stop member 92 may be an individual element, it should be understood that it may also be an integral part of another member such as, for example, a plunger 93, as shown in FIG. 2, of the pump assembly 12 described hereinafter.

Referring particularly to FIG. 5, the exterior surface 80 of the valve spool 73 has two diametrically oriented and preferably opposed slots 94 and 95 formed therein. Inasmuch as the configuration of each slot may be identical to the other, it is only necessary to specifically describe one slot, such as slot 94, with the understanding that the specific description is applicable to slot 95. In particular, the slot 94 extends axially on the exterior surface 80, substantially the full length of the valve spool 73, terminating in angularly converging walls 96 and 97 which extend transversely toward the central axis of the valve spool 73 and, in turn, terminate in a longitudinal wall 100. A detent 101 is formed into the longitudinal wall 100, preferably at substantially the midpoint of the axial length of the valve spool 73 and of the wall 100.

Furthermore, two diametrically opposed axial bores 98 extend through the valve spool 73 and slidably engage corresponding guide bars 99. The guide bars 99 are secured at each axial end, respectively, to the shoulder member 72 and the stop member 92, as shown in FIG. 4. Such arrangement prevents rotation of the valve spool 73 relative to the connecting rod 71, thereby assuring free axial movement of the valve spool 73 thereon.

Radial arms, 102 and 103, having acutely tapered radially inner ends extend outwardly from a pivotal engagement with the detent 101 of the respective slot, 94 and 95, as shown in FIG. 5. The radially outward end of radial arm 102 pivotally engages a socket 104 in the plunger stem 105 of a compressor 106 which is sealingly mounted to, and extends through, the cylinder wall 55 at a location which is preferably substantially the midpoint of the stroke travel of the connecting rod 71 in the medial region of the valve spool 73.

The plunger stem 105 is a substantially cylindrical member having a radial groove 110 about its periphery, at the opposite end from the socket 104, for the retention of an O-ring 111. The plunger stem 105 is slidably positioned withihn a cylinder casing 112 in a compressor housing 113, which together define a compression chamber 114. The plunger stem 105 is biased radially inward toward the valve spool 73 as a result of a compression spring 115 applying a force sufficient to retain the end of radial arm 102 seated within the socket 104 of the plunger stem 105. Inlet check valve 116 and outlet check valve 117 permit unidirectional flow through the compression chamber 114 in coordination with the reciprocatory movement of the plunger stem 105.

As will be recognized, spring 115 will transmit a transverse force through the plunger stem 105 and through the radial arm 102 to the valve spool 73. To oppose this force, radial arm 103 is pivotally engaged within a socket member 120 of a plunger 119 which is itself biased by a compression spring 121 housed within a housing member 122. The housing member 122 is sealingly affixed to and extends through the cylinder wall 55 at a location substantially diametrically opposite that of the compressor 106. As such, it should be realized that the opposing forces generated by compression springs 115 and 121 cancel out the radial components of each other, thus resulting in substantial equilibrium in the radial forces acting on the valve spool 73.

As indicated hereinabove, the exemplary embodiment shown in FIG. 2 is directed to a fluid pumping device. As such, the connecting rod is operatively associated with the plunger 93 of a primary pump assembly. The cylinder housing 52 is sealingly joined to a pump head 123, thus defining the axial limit of the second chamber 57 of the cylinder housing 55 and representing internally therewith an exhaust chamber 124. An axial opening 125 extends through the pump head 123 and has a diameter slightly larger than the outside diameter of the plunger 93 such that the latter is freely slidable therein. A pump diaphragm 126 is affixed at its center to the radial face 127 of the plunger 93 and is sealably affixed at its periphery to the annular face 128 formed between coaxial cavities 130 and 131 respectively, thus forming a fluid-tight barrier at the juncture thereof. End plate 132, as shown in FIG. 3, is sealingly affixed over the annular end face 133 of the pump head 123 and together, in conjunction with the pump diaphragm 126 and the larger coaxial cavity 131, defines an enclosed pump chamber 134.

As best seen in FIG. 2, radial port 135 extends through the wall of the pump head 123 into the pump chamber 134 and is sealingly joined to a pump conduit 136, thus effecting fluid communication between the pump chamber 134 and the master chamber 140 of circulation pump 15, which may preferably be a standard membrane pump. Substantially incompressible fluid 141, such as hydraulic oil, is dispersed throughout the pump chamber 134, conduit means 136, and master chamber 140 such that a change in volume of the pump chamber 134 results in a correspondingly inverse change in volume of the master chamber 140, that is, an increase in volume of the pump chamber 134 results in a corresponding decrease in the volume of the master chamber 140 and vice-versa.

The advantages of the disclosed solar powered pump assembly 10, and its individual components, may be better recognized and understood by considering the operation thereof through a pump cycle. In particular, reference is made to an exemplary cycle in which the work fluid in the thermodynamic cycle is a vaporizable fluid such as water, although the pump cycle is capable of utilizing other recognizable fluids such as ammonia or a hydrocarbon.

The pump cycle is first considered from the initial state, as shown in FIG. 3, in which the piston 61 and connecting rod 71 are in the fully retracted position. Expansible chamber 70 is fully contracted and the valve spool 73 is positioned so that radial passageway 75 in the connecting rod 71 is within the high pressure region 76 of the valve spool 73, thereby connecting the expansible chamber 70 with the interior chamber 30 of the solar collector 11 via region 76.

With the connecting rod 71 fully retracted as seen in FIG. 3, the plunger 93 is likewise retracted, increasing the volume of the pump chamber 134 to its maximum capacity and filling it with the fluid 141 drawn from the master chamber 140 of the circulation pump 15. The volume of the master chamber 140 is correspondingly reduced by the flow of pump fluid 141 into the pump chamber 134. The impermeable pump membrane 142 is drawn toward the master chamber 140 and the volume of the slave chamber 143 is correspondingly increased, drawing the system fluid 144, that is, the fluid being pumped, into the slave chamber 143 through the unidirectional inlet valve 145.

In the initial stages of the pump cycle, radial arm 102 is angularly oriented radially and axially toward the expansible chamber 70, as shown in FIG. 3, and the plunger stem 105 of the compressor 106 is at maximum extension from the compressor housing 113. Vaporizable fluid in a cooled, preferably liquid state, is drawn into the compression chamber 114 through unidirectional inlet check valve 116.

When the solar collector 11 is exposed to the sun, solar radiation is absorbed by the light-absorbing coating 27 on the interior of the inner tube 21, thereby causing a substantial rise in temperature within the interior chamber 30. Because of such rise in temperature, the fluid within the interior chamber 30 changes from a liquid to a vapor state. Such change of state accompanying the increase in temperature causes a substantial increase in pressure within the interior chamber 30. This pressure increase communicates through the exterior conduit 91 and flexible interior conduit 86 to the high pressure region 76 of the valve spool 73. The pressure increase is likewise directed through the radial passageway 75 and axial passageway 74 into the expansible chamber 70.

At this point it should be appreciated that because the cylinder head 32 is made from a heat conductive material, such as brass, the temperature within the expansible chamber 70 is at an elevated level substantially equal to the temperature of the interior chamber 30 of the solar collector 11. This is true in part because of efficient conductive heat transfer through wall member 51 of the cylinder head 32. While the entire cylinder head 32 may be constructed from the heat conductive material, it may be more economical merely to use a heat conductive insert, such as a cylindrical brass plug, in the region of the wall member 51, the desired effect being substantially equivalent, i.e., efficient conductive heat transfer. The advantage of the elevated temperature in the expansible chamber 70 is found in the capability of maintaining the increased pressure of the vaporized fluid, inasmuch as the change in pressure of a gas in a closed vessel is directly proportional to the change in temperature of the gas. As such, the elevated temperature in the expansible chamber 70 assists in maintaining the increased pressure of the vaporized fluid therein.

As the high pressure vaporized fluid flows into the expansible chamber 70, a net resulting axial force acts upon the diaphragm 54 and the piston face 67 causing the piston 61 and connecting rod 71 to move axially. When this occurs, plunger 93 is forced into the pump chamber 134, reducing the volume thereof and discharging the pump fluid 141 into the master chamber 140 of the circulation pump 15. As this occurs, the pump membrane 142 is forced toward the slave chamber 143, thereby reducing its volume and discharging the system fluid 144 out through the unidirectional outlet valve 146.

As the connecting rod 71 moves toward its extended position, radial arm 102 is pivoted from its original orientation to an orientation substantially perpendicular to the longitudinal axis of the connecting rod 71. As this occurs, plunger stem 105 is displaced into the compressor 106, thereby reducing the volume of the compression chamber 114 and discharging the vaporizable fluid, under pressure and in a substantially liquid state, out through the outlet check valve 117 where it is carried through the supply conduit 118 to the interior chamber 30 of the solar collector 11 via the inlet port 44.

As the connecting rod 71 continues extending under the increased pressure in the expansible chamber 70, the radial arm 102 pivots beyond its substantially perpendicular position to an angular orientation directed toward the pump head 123. This orientation allows the compression spring 115 to return the plunger stem 105 toward its fully extended position which in turn draws more vaporizable fluid into the compression chamber 114 through inlet check valve 116.

When the connecting rod 71 extends a sufficient distance beyond the midpoint of the stroke travel, compression spring 115 and compression spring 121 impart a resulting axial force, through radial arms 102 and 103 respectively, to the valve spool 73 such that it slides axially on the connecting rod 71 toward and subsequently against stop member 92, as shown in FIG. 2. As this occurs, radial passageway 75 is disconnected from the high pressure region 76 of the valve spool 73 and moves into communication with the low pressure exhaust chamber 124 of the cylinder housing 52, to connect the expansible chamber 70 therewith. At this time, the pressure within the expansible chamber 70 is vented into the exhaust chamber 124, where it is subsequently vented through a vent port 150 in the cylinder wall 55. A vent conduit 151 connects the vent port 150 of exhaust chamber 124 with a condensor 152 which cools the fluid, converting it back into a substantially liquid state prior to its being directed to the inlet check valve 116 of the compressor 106.

As the pressure in the expansible chamber 70 drops, the piston 61 and connecting rod 71 return to the original retracted position. A biasing force is needed to overcome the net axial force acting on the connecting rod 71 through the radial arms 102 and 103 in order to return the connecting rod 71 to its original position. Such a biasing force can be provided in many ways, e.g., a bias coil spring may be positioned concentrically over the plunger 93 between the stop member 92 and the pump head 123, thus imparting an axial force to the connecting rod 71 via the stop member 92. Alternatively, it has been found that in certain installations such as the depicted solar water heating system, the system fluid 144 may be under pressure as it flows through inlet valve 145. This being the case, the pressure acting on the pump membrane 142 is transmitted through the pump fluid 141 to the pump diaphragm 126 which imparts an axial force to the plunger 93. Such biasing force is generally sufficient to overcome the aforementioned axial forces transmitted through the radial arms 102 and 103, and thus is capable of returning the piston 61 and connecting rod 71 to the original retracted position.

As the connecting rod 71 moves to the retracted position, plunger 93 is withdrawn from the pump chamber 134, increasing the volume thereof and drawing in fluid 141 from the master chamber 140. Pump membrane 142 is drawn toward the master chamber 140 as a result of the outflow of pump fluid 141 therefrom. Accordingly, system fluid 144 is drawn into the slave chamber 143 through inlet valve 145 and the circulation pump 15 is in condition for another compressive stroke.

The return movement of the connecting rod 71 causes the radial arm 102 to, again, pivot through an orientation substantially perpendicular to the longitudinal axis of the connecting rod 71. As such, the compressor 106 once again undergoes a compressive stroke similar to that experienced when the connecting rod 71 was being extended. Similarly, as radial arm 102 pivots beyond the perpendicular orientation to its original angular orientation toward the cylinder head 32, the compressor 106 undergoes an intake stroke as the plunger stem 105 is again extended under the force of compression spring 115.

When the connecting rod 71 retracts a sufficient distance beyond the midpoint of the stroke, compression spring 115 and spring 121 again impart a resulting axial force through radial arms 102 and 103, respectively, on valve spool 73, in the direction toward the cylinder head 32. This axial force causes the valve spool 73 to shift axially on the connecting rod 71 toward the shoulder member 72. When this occurs, radial passageway 75 is again positioned within the high pressure region 76 of the valve spool 73 thereby connecting the expansible chamber 70 with the inner chamber 30 of the solar collector 11. At this time, the pump assembly 12 is once again conditioned for an expansion stroke.

In conjunction with the foregoing description of a complete pump cycle, several factors should be appreciated. Because the piston 61 and the plunger 93 are mechanically connected, a direct pressure relation is achieved between the expansible chamber 70 and the pump chamber 134. In this respect if the effective area of the piston 61 is four times as great as the effective area of the plunger 93, then the corresponding pressure in the pump chamber 134 must be four times as great as the pressure in the expansible chamber 70. Thus it should be realized that a large work potential is available from the pump fluid 142 when significant pressures are developed in the collector 11.

The description of the pump cycle reveals that for each complete cycle of the connecting rod 71, the compressor 106 undergoes two complete cycles, the first cycle occurring on the extending stage of the connecting rod 71 cycle and the second cycle occurring on the retracting stage thereof. This two to one relationship assures that a sufficient quantity of vaporizable fluid will be introduced into the interior chamber 30 of the solar collector 11 to replenish the flow into the expansible chamber 70.

Figure 7:
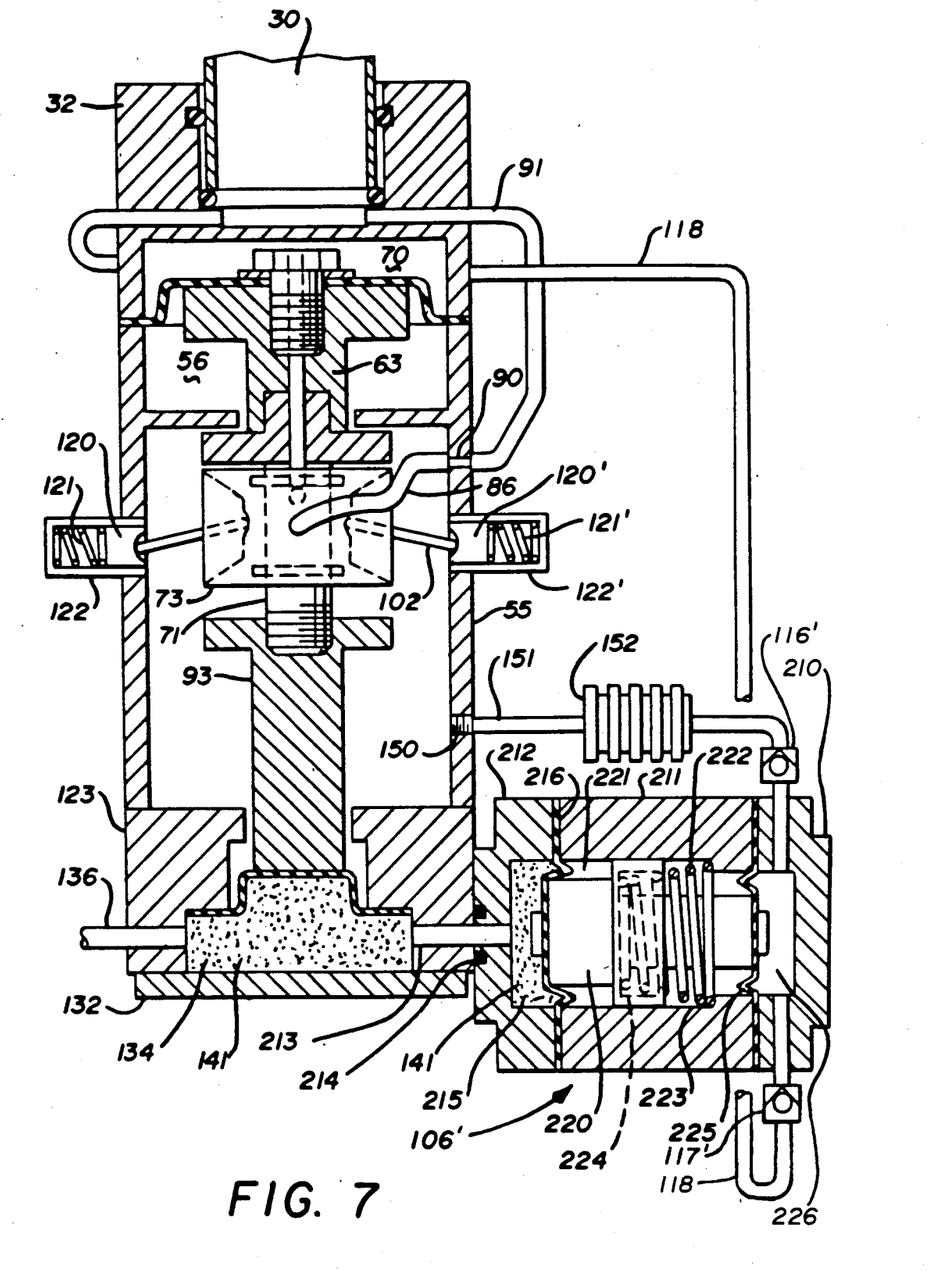
FIG. 7 is a fragmentary cross-sectional view of an alternative embodiment of the pump housing of the pump assembly of FIG. 2 showing an alternative compressor assembly.

The foregoing advantages and characteristics are likewise associated with the alternative embodiment depicted in FIG. 7. In this embodiment, an alternative, fluid-powered, compressor 106' is employed to compress the vaporizable fluid and then return it to the interior chamber 30 of the solar collector 11. The mechanically actuated compressor 106 is positionally replaced with a socket member 120', counter force spring 121' and housing member 122', identical to the corresponding similar elements 120, 121 and 122, respectively, so as to engage the radial arm 102 in a manner to effect the above-described shifting movement of the spool 73.

The fluid-powered compressor 106' is comprised essentially of a compressor head 210, compressor body 211, and mounting plate 212. The mounting plate 212 is secured to the pump head 123 and fluidly communicates with the pump chamber 134 therein, through a connecting port 213 about which is positioned an O-ring 214 to assure a fluid-tight connection.

The mounting plate 212 defines a first chamber 215 fluidly communicating with the connecting port 213. A first membrane 216 defines one wall of the first chamber 215 and is operatively associated with a substantially cylindrical connecting piston 220 contained within the cavity 221 of compressor body 211. A return spring 222 is positioned concentrically about the connecting piston 220 between an annular shoulder 223 of the cavity 221 and an annular recess 224 in the connecting piston 220. As such, the return spring 221 imparts a bias force upon the connecting piston 220 to urge the piston 220 and the first membrane 216 into the first chamber 215, thereby reducing the volume of the latter.

Axially opposed to the first membrane 216, the connecting piston 220 is secured to a second membrane 225 which, together with the compressor head 210 defines a compression chamber 226. Inlet and outlet check valves, 116' and 117', respectively, are associated with the compression chamber 226 to effect a unidirectional flow of vaporizable fluid therethrough upon reciprocation of the connecting piston 220 and second membrane 225.

Because of the direct mechanical interconnection of the first chamber 215 and the second chamber 226 via the first membrane 216, connecting piston 220, and second membrane 225, it must be appreciated that a change of volume of the first chamber 215 results in an equal, but opposite, change of volume of the second chamber 226. Such volumetric change in the respective chambers is caused by the flow of incompressible pump fluid 141 through the connecting port 213 as caused by the reciprocal movement of the plunger 93.

As such, the operation of the compressor 106' should be understood as follows: As the plunger 93 extends into the pump chamber 134, incompressible pump fluid 141 is forced out therefrom through conduit means 136 and connecting port 213. That fluid which flows through connecting port 213 enters the first chamber 215 and effects a resulting force on the first membrane 216 which forces the connecting piston 220 toward the compression chamber 226 thereby expelling the vaporizable fluid in the second chamber 226 out through the outlet check valve 117' to be returned to the interior chamber 30 of the solar collector 11. During such movement, the piston 220 also compresses the return spring 222 against the annular shoulder 223. Upon retraction of the plunger 93 from the pump chamber 134, the incompressible pump fluid 141 is permitted to return to the pump chamber 134 from the first chamber 215. To assist this return flow, the return spring 222 effects a bias force upon the connecting piston 220 thereby causing it to reduce the volume of the first chamber 215 and expell the pump fluid 141 out through the connecting port 213. As the return spring 222 causes the connecting piston 220 to return to its original position, the compression chamber 226 expands, drawing in vaporizable fluid from the condensor 152 through the inlet check valve 116'.

When the connecting piston 220 returns to its original position, the compressor 106' is conditioned to effect another compression stroke. As such it should be appreciated that this embodiment assures a continuous supply of vaporizable fluid to be supplied to the interior chamber 30 of the solar collector 11 corresponding to the pump assembly 12.

It should be recognized that other forms of interconnections can be employed, other than the plunger 93 and pump head 123 arrangement, to provide a desired mechanical work output. For example, plunger 93 can be replaced by a mechanical coupler link thereby providing reciprocal linear motion from the connecting rod 71 to power the desired machinery or to be further transformed to achieve the desired useful work.

In addition, it should be recognized that while the foregoing teaches a pump assembly 12 having a single action piston 61, i.e., pressure acting on one side of the piston 61 only, it is well within the scope of this disclosure to employ alternative piston arrangements. For example, it would be appreciated by one skilled in the art that a double acting piston arrangement could be employed in the pump assembly 12. Such an arrangement would permit the work pressure generated by the vaporizable fluid to act, alternately, on axially opposed ends of the piston 61 thereby eliminating the need for a bias return force and effectively doubling the work output capacity of the pump assembly 12.

It should be further recognized that the work output available from the pump assembly 12 is proportional to the amount of solar radiation heat absorbed by the solar collector 11. Therefore, when an overcast weather condition exists, such that solar radiation is substantially diminished, the work output of the pump assembly 12 may be less than the demand requirements. In such circumstances it may be desirable to employ an alternative energy source to supplement the diminished solar energy. Such an alternative energy source may be an electric resistance heater located within the interior chamber 30 of the inner tube 21 and employing a pressure actuated switch operatively associated with the resistance heater and in fluid communication with the interior chamber 30 through a port all as would be apparent to persons skilled in the art. When the pressure within the interior chamber 30 falls below a preselected value, as a result of reduced solar radiation for example, the pressure actuated switch would complete the electrical circuit, thereby connecting the resistance heater to a suitable electrical power supply line. The resistance heater would continue supplying the necessary thermal energy to assure continued operation of the pump assembly. When the solar radiation increases to the point supplemental heating is no longer required, the pressure within the interior chamber 30 will increase to thus deenergize the resistance heater. Normal operation of the solar powered pump assembly 10 would thereafter continue until the solar radiation is again diminished.

Conversely, during extremely clear weather conditions, the exposure of the solar collector 11 may result in potential work output greatly exceeding the demand. Should this occur, it maybe necessary to reduce the exposure of the solar collector 11 to the available solar radiation to prevent the pressure in the interior chamber 30 from exceeding a safe working level, which may damage the solar collector 11 or the pump assembly 12. To this end, the opaque, light-weight sun shield 13 is movably associated with respect to the solar collector 11 to selectively interrupt the exposure to solar radiation.

The sun shield 13 may be constructed from thin sheet aluminum, or other light-weight opaque material, and preferably has a partially cylindrical shape with a radial curvature concentric to, though slightly larger than, the outer shell 20 of the solar collector. The sun shield 13 is operatively associated with the control element 14 through a control arm 160 having a longitudinal leg 161, fixedly secured to the sun shield 13, and a radial leg 162 pivotally secured to the control element 14. Thus, the sun shield 13 may be selectively positioned circumferentially with respect to the solar collector 11 to regulate the amount of exposure to solar radiation.

The control element 14, as shown particularly in FIG. 2, is composed of a control housing 163 having a base section 164 and a main body section 165. The base section 164 has a substantially planar surface 166 suitable for mounting on a flat surface and may represent a suitable replacement for the end plate 132 of FIG. 3 when mounted to the annular end face 133 of the cylinder housing 52, as shown in FIG. 2. A radial base cavity 167 extends opposite the planar surface 166 axially from an annular face 170. A port 171 extends radially through the wall of the base section 164 for connecting the base cavity 167 with a sensor conduit 172.

Referring to FIGS. 2 and 6, the main body section 165 has a cavity 173 extending axially from an annular surface 174 and terminating at an annular support wall 175, the radial cavity 173 having an internal diameter substantially equal to the internal diameter of base cavity 167. A bearing opening 176 substantially coaxial with the radial cavity 173 extends through the support wall 175 and communicates with a substantially larger diameter spring cavity 177 which extends axially from the end wall 180 of the main body section 165. Axial pins 181 and 182 depend from the support wall 175 into the vicinity of the radial cavity 173 and are preferably equally spaced about a common circumference.

A substantially cylindrical driver 183, with an outside diameter slightly less than the inside diameter of the radial cavity 173 so as to allow positioning within the latter, has a central bore 184 and two circumferential bores 185 and 186 extending axially inward from one transverse surface thereof, as shown in FIG. 6. The circumferential bores 185 and 186 are suitably located to permit axially slidable engagement of the driver 183 with the axial pins 181 and 182 within the radial cavity 173. Diametrically opposed radial pins 187 and 188 depend radially inward from the inner periphery of the central bore 184. Control shaft 190 has spaced helical grooves 191 and 192 diametrically disposed about its periphery, which slidably engage the radial pins 187 and 188 when the control shaft 190 is operatively oriented within the central bore 184 of the driver 183.

The control shaft 190 extends axially through the bearing opening 176, which renders lateral support thereto, and the spring cavity 177 and outwardly a substantial distance beyond the end wall 180. One end of a spiral coiled spring 193 is secured to the control shaft 190 in the vicinity where the latter passes through the spring cavity 177. The other end of the spiral coiled spring 193 is secured to a retainer pin 194 which depends axially into the spring cavity 177 when a retainer cap 195 is secured to the end wall 180, thus rotationally securing the spiral coiled spring 193 within the spring cavity 177. The control shaft 190 extends through and is journaled in an opening 196 in the retainer cap 195 which thereby renders additional lateral support to the control shaft 190. A collar 200 is nonrotatably secured to the control shaft 190 by a pin 200' and has a radial opening 201 in which the control arm 160 for the sun shield 13 is operatively rigidly attached.

A control diaphragm 202 is sealingly joined about its periphery to the mating interface of annular face 170 and the annular surface 174 when the base section 164 and the main body section 165, respectively, are joined together to form the control housing 163. The control diaphragm 202 is operatively associated at its central region with a radial face 203 of the driver 183 and thus defines, with the base cavity 167, an expansible control chamber 204.

It should be appreciated that this embodiment of the control means 14 provides controlled movement of the sun shield 13 as the pressure in the control chamber 204 varies. Particularly, it is preferred that sensor conduit 172 be connected with the interior chamber 30 of the solar collector 11 thereby providing pressure in the control chamber 204 substantially equal to the pressure in the interior chamber 30. This being the case, as the pressure increases in excess of a predetermined value, as governed by the bias force of the spiral coiled spring 193, the resulting force on the effective area of the driver 183 will force the latter to move axially with respect to the control shaft 190. As the driver 183 so moves, the association of the radial pins 187 and 188 therein with the helical grooves 191 and 192 of the control shaft 190 converts the linear axial movement of the driver 183 into a corresponding rotational movement of the control shaft 190. This rotational movement radially disposes the sun shield 13 to interrupt or reduce exposure of the solar collector 11 to solar radiation.

When this occurs, the drop in temperature of the interior chamber 30, and the corresponding drop in pressure therein, will cause a reduction of pressure in the control chamber 204. When the pressure drops below a predetermined value, the resultant force on the driver 183 will no longer exceed the bias force of the spiral coiled spring 193 and the latter will cause the control shaft 190 to rotate to permit the solar collector 11 to, once again, be subject to greater exposure to solar radiation.

It will be appreciated that by varying the torsional bias of the spiral coiled spring 193, it is possible to regulate the exposure of the solar collector 11 sufficiently to maintain a desired maximum work pressure within the interior chamber 30. It should further be appreciated that other control feedback systems might be employed to regulate the exposure of the solar collector 11. For example, by replacing the spiral coiled spring 193 with a temperature sensor spring and exposing the latter to the system fluid of a solar heating system, the sun shield 13 can be selectively moved into and out of an interrupting disposition by the torsional force of the temperature spring when the system fluid reaches a predetermined maximum value. Thus, the solar pump assembly 10 can stop the pumping operation until the system fluid has cooled to an extent requiring further heating, at which time the temperature spring can move the sun shield 13 to an uninterrupting disposition and the pumping operation can resume, thereby pumping the system fluid to the solar panels for heating.

Preferred and alternative embodiments of a solar powered device incorporating the concept of the present invention are shown by way of example in the accompanying drawings without attempting to show all the various forms and modifications in which the invention might be embodied, the invention being measured by the appended claims and not by the details of the specification.

I claim:

1. Apparatus for converting thermal radiation into mechanical work comprising collector means to receive and concentrate the thermal radiation to generate pressure by vaporizing a working fluid, said collector means having an interior chamber; expansible chamber means selectively in fluid communication with said collector means and having at least one movable wall; thermally conductive wall means communicating said interior chamber with said expansible chamber, to effect direct thermal communication therebetween; movable piston means operatively associated with said movable wall;

connecting rod means having one end secured to said piston means, the other end being suitable for interrelating with a mechanical load; exhaust chamber means having a pressure substantially less than the work pressure of said collector means; compressor means to receive working fluid from said exhaust chamber means and to supply working fluid to said collector means; and valve means incorporated in said connecting rod means to effect fluid communication of said expansible chamber means alternately with said collector means and said exhaust chamber means.

2. A solar powered pump assembly comprising collector means to receive and concentrate solar radiation energy to generate pressure by vaporizing a working fluid, said collector means having an interior chamber; expansible chamber means selectively in fluid communication with said collector means and having at least one movable wall; thermally conductive wall means communicating said interior chamber with said expansible chamber means to effect direct thermal communication therebetween; movable piston means operatively associated with said movable wall; connecting rod means having one end secured to said pistion means and having port means in fluid communication with said expansible chamber means, the other end being operatively affixed to plunger means; exhaust chamber means having a pressure substantially less than the work pressure of said collector means; compressor means to receive working fluid from said exhaust chamber means and to supply working fluid to said collector means; valve means incorporated in said connecting rod means to effect fluid communication of said expansible chamber means alternately with said collector means and said exhaust chamber means; and pump chamber means compressibly associated with said plunger means and suitable for pumping a fluid.

3. Apparatus for converting thermal radiation into mechanical work comprising collector means to receive and concentrate the thermal radiation to generate pressure by vaporizing a working fluid; expansible chamber means selectively in fluid communication with said collector means and having at least one movable wall; movable piston means operatively associated with said movable wall; connecting rod means having port means in fluid communication with said expansible chamber means and having one end secured to said pistion means, the other end being suitable for interrelating with a mechanical load; exhaust chamber means having a pressure substantially less than the work pressure of said collector means; compressor means to receive working fluid from said exhaust chamber means and to supply working fluid to said collector means; and valve means slidably received about said connecting rod means and cooperating therewithto define a region in fluid communication with said collector means, said valve spool being axially slidable relative to said connecting rod means in the vicinity of said port means to effect fluid communication of said expansible chamber means alternately with said collector means and said exhaust chamber means, said compressor means being driven by said valve means.

4. A solar powered pump assembly comprising collector means to receive and concentrate solar radiation energy to generate pressure by vaporizing a working fluid; expansible chamber means selectively in fluid communication with said collector means and having at least one movable wall; movable piston means operatively associated with said movable wall; connecting rod means having one end secured to said piston means and having port means in fluid communication with said expansible chamber means, the other end being operatively affixed to plunger means; exhaust chamber means having a pressure substantially less than the work pressure of said collector means; compressor means to receive working fluid from said exhaust chamber reans and to supply working fluid to said collector means; valve means slidably received about said connecting rod means and cooperating therewith to define a region in fluid communication with said collector means, said valve spool being axially slidable relative to said connecting rod means in the vicinity of said port means to effect fluid communication of said expansible chamber means alternately with said collector means and said exhaust chamber means, said compression means being driven by said valve means; and pump chamber means compressibly associated with said plunger means and suitable for pumping a fluid.

5. Apparatus for converting thermal radiation into mechanical work comprising collector means to receive and concentrate the thermal radiation to generate pressure by vaporizing a working fluid, said collector means having an interior chamber; expansible chamber means selectively in fluid communication with said collector means and having at least one movable wall; thermally conductive wall means communicating said interior chamber with said expansible chamber means to effect direct thermal communication therebetween; movable piston means operatively associated with said movable wall; connecting rod means having port means in fluid communication with said expansible chamber means and having one end secured to said pistion means, the other end being suitable for interrelating with a mechanical load; exhaust chamber means having a pressure substantially less than the work pressure of said collector means; compressor means to receive working fluid from said exhaust chamber means and to supply working fluid to said collector means; and valve means slidably received about said connecting rod means and cooperating therewith to define a region in fluid communication with said collector means, said valve spool being axially slidable relative to said connecting rod means in the vicinity of said port means to effect fluid communication of said expansible chamber means alternately with said collector means and said exhaust chamber means.

6. Apparatus according to claim 5, in which said valve means is a valve spool.

7. Apparatus according to claim 5, in which said thermally conductive wall member is directly exposed to working fluid existing within said interior chamber.

8. Apparatus according to claim 5, in which said compressor means is operatively associated with said connecting rod means.

9. Apparatus according to claim 5, further comprising: movable shield means to selectively interrupt the exposure of said collector means to the thermal radiation; and control means to selectively orient said shield means in thermal radiation interrupting disposition relative to said collector means.

10. Apparatus according to claim 9, in which said control means is a pressure actuated device operatively associated with the working pressure of said collector means.

11. Apparatus according to claim 5, in which said collector means is a vacuum bottle-type solar collector suitable for receiving and concentrating solar radiation 12. Apparatus, according to claim 11, further comprising: movable shield means to selectively interrupt the exposure of said collector means to solar radiation; and control means to selectively orient said shield means in a solar radiation interrupting disposition relative to said collector means.

13. Apparatus according to claim 12, in which said control means is a pressure actuated device operatively associated with the working pressure of said collector means.

14. A solar powered pump assembly comprising collector means to receive and concentrate solar radiation energy to generate pressure by vaporizing a working fluid, said collector means having an interior chamber; expansible chamber means selectively in fluid communication with said collector means and having at least one movable wall; thermally conductive wall means communicating said interior chamber with said expansible chamber means to effect direct thermal communication therebetween; movable piston means operatively associated with said movable wall; connecting rod means having one end secured to said piston means and having port means in fluid communication with said expansible chamber means, the other end being operatively affixed to plunger means; exhaust chamber means having a pressure substantially less than the work pressure of said collector means; compressor means to receive working fluid from said exhaust chamber means and to supply working fluid to said collector means; valve means slidably received about said connecting rod means and cooperating therewith to define a region in fluid communication with said collector means, said valve spool being axially slidable relative to said connecting rod means in the vicinity of said port means to effect fluid communication of said expansible chamber means alternately with said collector means and said exhaust chamber means; and pump means compressibly associated with said plunger means and suitable for pumping a fluid.

15. A solar powered pump assembly, according to claim 14, in which said compressor means is operatively associated with said pump chamber means.

16. A solar powered pump assembly, according to claim 14, in which said compressor means is operatively associated with said connecting rod means.

17. A solar powered pump assembly, according to claim 11, in which said collector means is a vacuum bottle-type solar collector.

18. A solar powered pump assembly, according to claim 14, further comprising: circulation-type pump means operatively associated with said pump chamber means and suitable for pumping a separate fluid.

19. A solar powered pump assembly, according to claim 14, in which said valve means is a valve spool.

20. A solar powered pump assembly, according to claim 14 in which said thermally conductive wall means is directly exposed to working fluid existing within said inerior chamber.

21. A solar powered pump assembly, according to claim 14, further comprising: movable shield means to selectively interrupt the exposure of said collector means to solar radiation; and control means to selectively orient said shield means in a solar radiation interrupting disposition relative to said collector.

22. A solar powered pump assembly, according to claim 21, in which said control means is a pressure actuated device operatively associated with the working pressure of said collector means.

* * * * *

UNITED STATES PATENT AND TRADEMARK OFFICE
CERTIFICATE OF CORRECTION

PATENT NO.   : 4,666,376
DATED        : May 19, 1987
INVENTOR(S)  : Fred D. Solomon It is certified that error appears in the above-identified patent and that said Letters Patent is hereby corrected as shown below:

Column 2, line 6, after "satellites," the word "of" (first occurence) should read --or--

Column 6, line 50, "withihn" should read --within--

Column 15, line 23, "pistion" should read --piston--

Column 16, line 7, "reans" should read --means--

Column 18, line 2, after "pump" insert --chamber--

Column 18, line 13, the numeral "11" should read --14--

Signed and Sealed this

First Day of August, 1989

*Attest:*

DONALD J. QUIGG

*Attesting Officer*           *Commissioner of Patents and Trademarks*